United States Patent [19]

Shires et al.

[11] Patent Number: 4,942,509
[45] Date of Patent: Jul. 17, 1990

[54] CONTROL ARRANGEMENT FOR A SWITCH MODE POWER SUPPLY

[75] Inventors: Jonathanes Shires; John Turner, both of Wetherby, England

[73] Assignee: Farnell Instruments Limited, Wetherby, United Kingdom

[21] Appl. No.: 329,450

[22] Filed: Mar. 28, 1989

[51] Int. Cl.$^5$ .......................................... H02M 3/335
[52] U.S. Cl. ..................................... 363/89; 363/21; 363/97; 323/222; 323/285; 323/288
[58] Field of Search ............................: 363/19-21, 363/124, 89, 97; 323/222, 282, 285, 288, 299

[56] References Cited

U.S. PATENT DOCUMENTS 4,677,366  6/1987  Wilkinson et al. .................... 363/89

FOREIGN PATENT DOCUMENTS

WO87/04023  12/1986  PCT Int'l Appl.

OTHER PUBLICATIONS

Dixon, Jr., "Pulse Width Modulator Control Methods with Complementary Optimization", Power Conversion International, vol. 8, No. 1, Jan. 1982, pp. 14–21.
Redl et al., "Switching-Mode Power Converters: Optimizing Dynamic Behavior with Input and Output Feed-Forward and Current-Mode Control" PowerCon 7, Mar. 25–27, 1980 pp. 1–16.

Primary Examiner—Peter S. Wong
Attorney, Agent, or Firm—Kinney & Lange

[57] ABSTRACT

Control arrangement for interfacing a convertor (4) in a switched mode power supply with a mains power supply (1) comprising a switch (14) for controlling input current to the arrangement from the mains power supply to have the same waveform as the input voltage to the arrangement from the mains supply, wherein there is provided a controller (16, 17, 25) operable to control the duty ratio of the switching means in dependence on a predetermined relation between a predetermined time varying signal generated by the controller, and a signal I derived from the input current.

10 Claims, 6 Drawing Sheets

CLOCK

MODULATOR WAVEFORMS

SW DRIVE

INPUT CURRENT i

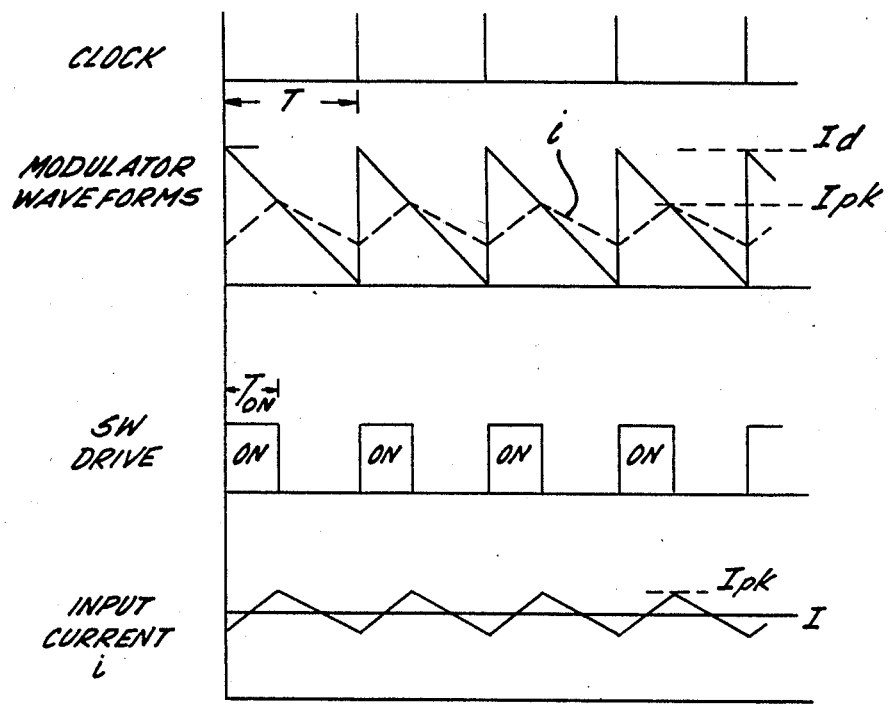

CONTROL ARRANGEMENT FOR A SWITCH MODE POWER SUPPLY

BACKGROUND OF THE INVENTION

1. Field of the Invention

This invention relates to a control arrangement for a switched mode power supply and in particular relates to a control arrangement for interfacing a convertor in a switched mode power supply with the mains power supply to the switched mode power supply for ensuring that the waveform of the input current from the mains power supply is corrected to be substantially the same waveform as the input voltage from the mains power supply.

2. Description of the Prior Art

Switched mode power supplies, which are primarily used for supplying large currents at low and medium voltages, have recently been the subject of intensive development in an effort to produce high efficiency power supplies which are both small and light weight. In such systems, a mains input is fed, via a RFI filter, to a rectifying and capacitive smoothing circuit which supplies the input to a DC/DC convertor, the convertor providing a regulated DC output. The general operation of such a switched mode power supply is well known and will not be described in detail herein.

It is a problem, however, with such arrangements of switched mode power supplies that a current is drawn only for a relatively short duration at the peak of the input voltage waveform. The apparent input power factor of prior art arrangements, i.e. unit output power plus convertor losses to mains input power, can be less than 0.5. Consequently, in order to handle the increased RMS current required, it is necessary to over dimension the input cabling and, in the case of an uninterruptable power supply system, the mains input source itself.

Hitherto, this problem has been addressed by providing the following control arrangement which comprises a switching means in parallel with the capacitor of the smoothing circuit. A feedback loop is used to sense the output voltage to the convertor, compare it with a reference level and feed the resulting error signal to a multiplier. A signal derived from the voltage input from the rectifier is also provided to the multiplier so that the resulting signal from the multiplier is a series of full wave rectified semi-sinusoids at mains frequency, whose amplitude is determined by the error signal. This signal is then compared to a signal derived from the input current to the convertor and the resulting error signal is fed to a clocked modulator to control the duty ratio of the switching means. Consequently, the average input current may be constrained to have substantially the same waveform as the input voltage. Additionally, the amplitude of the input current may be determined by the gain of the comparator which compares the output voltage to the convertor with a reference voltage level. Such arrangements are, however, complex and somewhat costly because of the design philosophy which requires the provision of an analogue multiplying element to allow the feedback signal to be modified by the input voltage waveform.

SUMMARY OF THE INVENTION

In accordance with the present invention, a control arrangement for interfacing a convertor in a switched mode power supply with a mains power supply comprises a switching means for controlling input current to the arrangement from the mains power supply to have the same waveform as input voltage to the arrangement from the mains supply, wherein there is provided a control means operable to control the duty ratio of the switching means in dependence on a predetermined relation between a predetermined time varying signal generated by the control means, and a signal I derived from the input current.

Such a control arrangement provides waveform correction without a requirement for an analog multiplier, or indeed any input voltage signal at all. Preferably, for a control arrangement in which the average output voltage ($V_o$) from the arrangement and the average input voltage ($V_i$) to the arrangement are related by $(V_o)=(V_i)f(D)$, where $f(D)$ is a function of the duty ratio D, then the predetermined relation may be an inverse linear relation in $f(D)$ and the signal I derived from the input current. Conveniently, the predetermined relation may also depend on a signal $I_d$ derived from the output voltage from the arrangement and the predetermined relation may then be $f(D)=I_d/I$.

The control arrangement may have control means configured as a feedback loop comprising means to sense the output voltage from the arrangement, means comparing the output voltage with a reference level to provide a signal $I_d$ derived from the output voltage from the arrangement, means providing the signal I to a modulator, and means providing the signal $I_d$ to the modulator, the modulator having a clocking means for resetting the modulator at a frequency substantially greater than that of said waveform, and wherein the modulator provides said predetermined time varying control signal to control the duty ratio D of the switching means in dependence on said predetermined relation.

Generally, however, where an output filter, such as a smoothing capacitor, is interposed between a power controlling arrangement and output terminals, then the filter may limit the speed of response of the system to changes in load current.

Hitherto, however, feedback loops for voltage regulation have not commonly addressed the problem of improving the speed of response to load current changes.

In accordance with a further aspect of the present invention, a control means for interfacing a power controlling means and output terminals for a load, includes a filter for providing a smoothed output to the terminals, and a feedback loop comprising voltage sensing means to sense the output voltage, means comparing the output voltage with a reference level to provide a voltage error signal, current sensing means to sense the output current and provide an output current signal, summing input means to an input of a comparator arranged as an amplifier of predetermined gain to add the voltage error signal and output current signal to provide a control signal from the comparator.

BRIEF DESCRIPTION OF THE DRAWINGS

The invention will now be described by way of example with reference to the drawings, in which:

FIG. 5b illustrates the operation of a modification of the arrangement shown in FIG. 4;

DETAILED DESCRIPTION OF THE PREFERRED EMBODIMENTS

Figure 1:
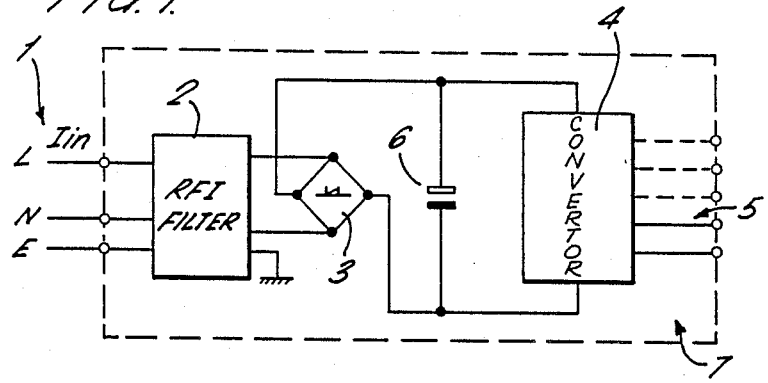
FIG. 1 depicts a known switched mode power supply unit.
Figure 2:
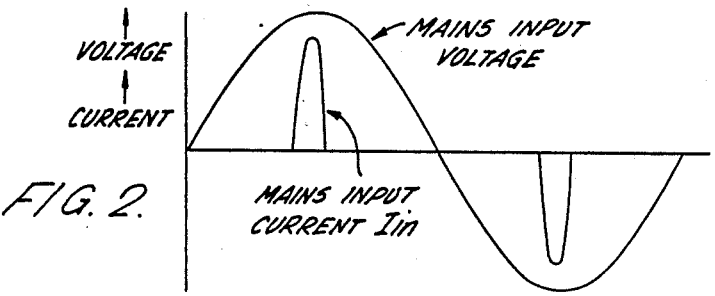
FIG. 2 depicts the waveforms of main input current and mains input voltage of the arrangement illustrated in FIG. 1.

Referring now to FIG, 1 which depicts a mains input switched mode power supply unit which does not address the problem of waveform correction, a mains input, indicated generally at 1 is shown feeding a RFI filter 2. The filter output is fed to a bridge rectifier 3 which provides an output voltage across a smoothing capacitor 6 to a DC-DC convertor 4. The regulated DC output terminals of convertor 4 are indicated generally at 5. It will be appreciated that the switched mode power supply unit falls schematically within the boundary indicated by the dashed lines 7. Turning to FIG. 2, a mains input current waveform is shown together with the associated mains input voltage waveform for a switched mode power supply as depicted in FIG. 1. It will be appreciated that, for such a supply, current is only drawn for a relatively short duration at the peak of the input voltage waveform. The apparent input power factor, i.e. the ratio of capacitor output power including convertor losses to mains input volt amperes, can be less than 0.5. Consequently, in order to handle the increased RMS current necessitated, the input cabling may have to be over dimensioned as may, in the case of an uninterruptable power supply system, the mains input source itself.

Figure 3:
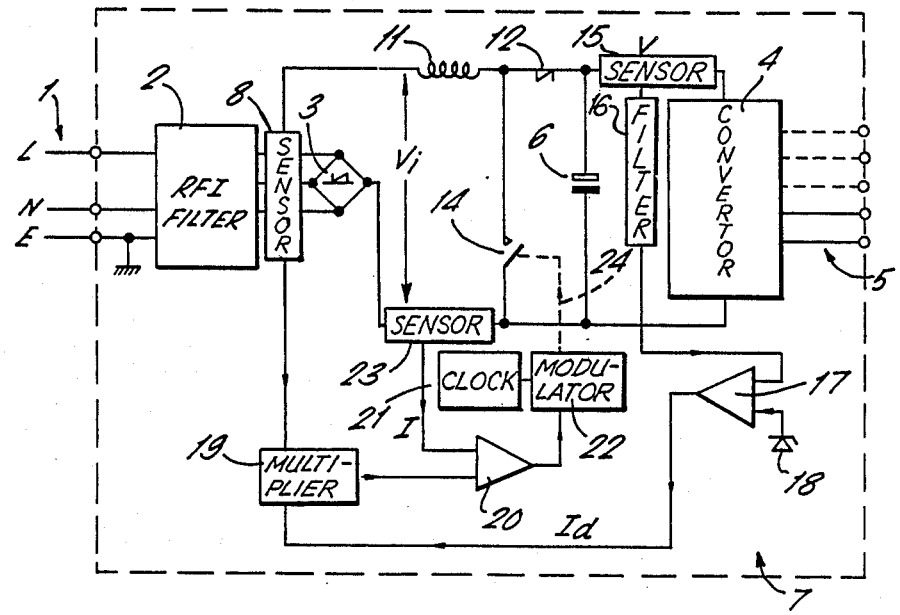
FIG. 3 is a known circuit for a switched mode power supply incorporating a waveform corrector requiring an analogue multiplying element in the feedback loop.

Referring now to FIG. 3 which depicts a known switched mode power supply incorporating a control arrangement to correct the input current waveform, it will be appreciated that like numerals reference the same circuit elements as hitherto described. The further description of the arrangement will be restricted therefore to the control arrangement which ensures that the input current to the arrangement has the same waveform as the input voltage to the arrangement. The control arrangement itself comprises a single ended boost convertor made up of inductor 11, semi-condUctor switch 14, rectifier diode 12 and reservoir capacitor 6 which together interface the convertor 4 and the mains power input indicated generally at 1. Additionally, the control arrangement comprises the feedback loop which comprises first voltage sensing means 15 to sense the output voltage $V_o$ to the convertor 4 from the arrangement. The feedback loop continues with a notch filter 16, the filtered output voltage being fed to a first comparator 17. First comparator 17 provides a signal $I_d$ proportional to the error between a reference voltage source 18 and the output voltage $V_o$ signal fed to notch filter 16. The notch filter 16 is necessary to remove the voltage ripple associated with smoothing capacitor 6. This is necessary since the capacitor 6 ripple voltage is phased shifted with respect to the input current waveform and would, if allowed to remain in the feedbacks loop, result in undesirable effects. The centre frequency of the notch filter 16 is arranged to be twice the mains source frequency.

The feedback loop continues with the error signal $I_d$ from the first comparator 17 being fed to one multiplying input of analogue multiplier 19. Second voltage sensing means 8 provides a sample of input voltage $V_i$ to the second multiplying input of multiplier 19. The resulting signal from multiplier 19 is a series of full wave rectified semi-sinusoids at mains frequency, whose amplitude is determined by the error signal from first comparator 17. Should output voltage $V_o$ fall as, for instance, load current increases, then the inclusion of error signal from the first comparator 17 into the feedback loop ensures that voltage regulation may be provided for. Current sensing means 23 provides a signal I proportional to and derived from the average input current. In addition, current sensing means 23 filters the switching frequency ripple from the current waveform and provides the signal I to a second comparator 20. Multiplier 19 provides the second signal to the second comparator 20. The error signal from second comparator 20 is fed to modulator 22 whose output 24 controls the switching means 14, in particular determining the duty ratio of the switching means 14, the operating frequency of the switching means 14 being determined by clock 21. It will be appreciated that the feedback loop ensures that the input current is constrained to have the waveform of the input voltage $V_i$ and to have an amplitude determined by the signal $I_d$ from comparator 17. Consequently, waveform correction as well as voltage regulation under varying load conditions is provided.

We refer now to the embodiments of the present invention.

Generally, if the control arrangement interfacing a mains power supply input 1 and a convertor 4 can be characterised as having an average output voltage $[V_o]$ to the associated convertor and an average input voltage $[V_i]$ from the mains power supply input 1, then $[V_o]$ and $[V_i]$ will be related by:

$$[V_o]=[V_i] f(D)$$

where f(D) is a function of the duty ratio D of the switching means 14. Consequently, if the switching means 14 is controlled so that f(D) is inversely proportional to the current signal I, then the input current waveform will be constrained to that of the input voltage for a fixed output voltage. Conveniently, the switching means may be controlled in this manner by a sawtooth modulator acting in dependence upon a predetermined relation between the sawtooth signal generated by the modulator and the signal I. Preferably, f(D) should also be a function of $I_d$, the signal derived from the output voltage, as well as I so that voltage regulation may be provided by an appropriate feedback loop.

The application of these general ideas to the working of the specific embodiments of the invention may be understood with reference to the following description.

Figure 4:
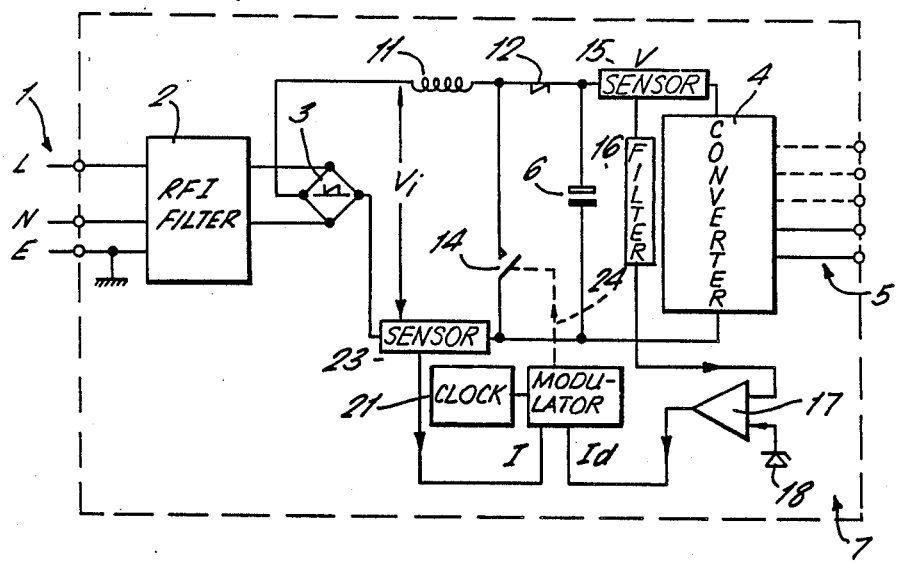
FIG. 4 depicts a control arrangement in a switched mode power supply unit in accordance with the present invention.
Figure 5A:
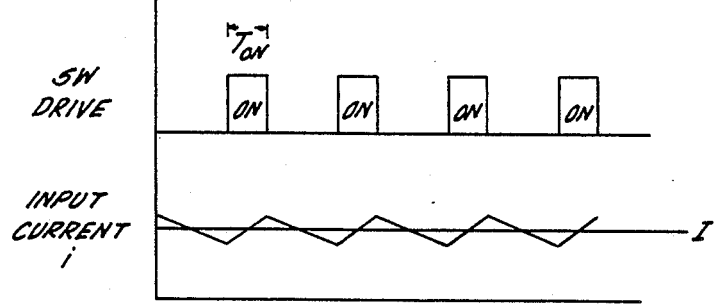
FIG. 5a depicts the pertinent waveforms which illustrate the operation of the switched mode power supply unit depicted in FIG. 4.

Referring now to FIGS. 4 and 5 which respectively depict a control arrangement in a switch mode power supply in accordance with the present invention and the pertinent waveforms associated therewith, it will be appreciated that the same boost convertor as hitherto described is still utilised. The control arrangement in the present embodiment comprises first voltage sensing means 15 to sense the output voltage $V_o$ to the convertoR 4, continuing with notch filter 16, the filtered output voltage being fed to a first comparator 17. First comparator 17 again provides a signal $I_d$ proportional to a error between a reference voltage source 18 and the output voltage $V_o$ signal fed to notch filter 16. This voltage error signal is then fed to a sawtooth modulator 25 where it controls the peak amplitude of the sawtooth waveform. Current sensing means 23 provides a signal I proportional to and derived from the average input current. Signal I is also fed to the sawtooth modulator. The modulator is arranged such that the point at which the sawtooth waveform levels exceeds the current signal I determines the point at which switching means 14 is closed. Switching means 14 is opened and the sawtooth modulator reset at a time determined by clocking means 21. The pertinent waveforms are depicted in FIG. 5a.

Alternatively the modulator can be configured so that the switching means 14 is closed by the clocking means 21. The (idealised) waveforms shown in FIG. 5b depicts a sawtooth waveform which is the inverse of that shown in FIG. 5a. In this scheme the switching means is opened at the point at which the current signal I exceeds the sawtooth waveform level. Switching means 14 is closed and the sawtooth modulator reset at a time determined by clocking means 21.

The waveform correction action of the present input of the invention may be understood as follows. For the boost converter operating in the continuous mode, and provided that the switching frequency determined by the clocking means 21 is much higher than the mains input frequency, then the average output voltage from the arrangement to the DC convertor 4 is given by:

$$[V_o]=[V_i]/(1-D)$$

where D is the switching means duty ration (i.e. $T_{on}/T_{period}$ where $T_{on}$ is the time for which the switch is closed and $T_{period}$ is the interval between adjacent clocking signals from the clocking means 21).

It will be appreciated from FIG. 5a that the sawtooth modulator provides a duty ratio given by $$D=1-I/I_d$$

Therefore $$[V_o]=[V_i]\times I_d/I$$

Rearranging, $I=I_d\times[V_i]/[V_o]$

Therefore $I=I_d\times V_{ipk}$ abs (sinwt) $/[V_o]$ since $[V_i]=-V_{ipk}\times$abs (sinwt) where abs (sinwt) = modulus of sinwt.

Consequently, for a fixed average output voltage $[V_o]$ and sawtooth peak amplitude $I_d$, then the input current I wave form is the same as the input voltage $V_i$ waveform. Further, since the sawtooth amplitude $I_d$ is determined by the error signal from the voltage comparator 17, then given sufficient gain in comparator 17, the input current I will be constrained to have sufficient amplitude to provide the required output voltage.

Referring to the arrangement illustrated by the waveforms of FIG. 5b, it may be appreciated that an advantage of this configuration is that it allows control of the instantaneous current in the switching means whilst still providing control of input current waveform. It can be seen that if the peak current in the input circuit is greater than the demand error signal $I_d$ then the switching means 14 will not be closed by the modulator. It is relatively simple to provide a fast acting peak current limiting circuit for the switching means. The speed of action of this limiting circuit is not restricted by the delay associated with an averaging circuit. The penalty paid for using this configuration is a slight distortion of the average input current waveform since the peak input current rather than average input current is constrained to follow the input voltage waveform, i.e.

$$I_{pk}=I_d\times V_{ipk}\text{abs(sinwt)}/[V_o]$$

Figure 6:
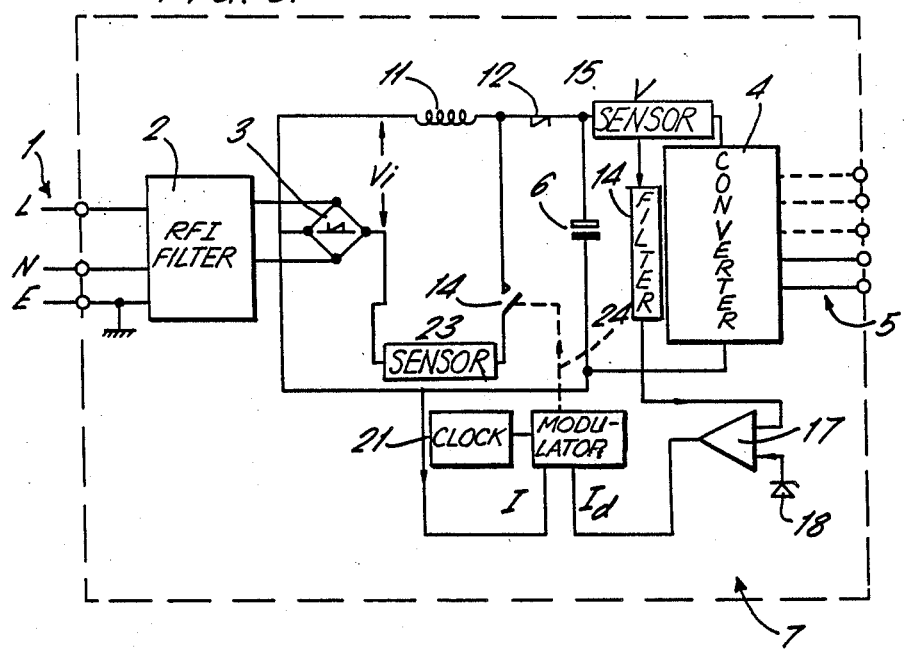
FIG. 6 depicts a further control arrangement in a switched mode power supply in accordance with the present invention.
Figure 7:
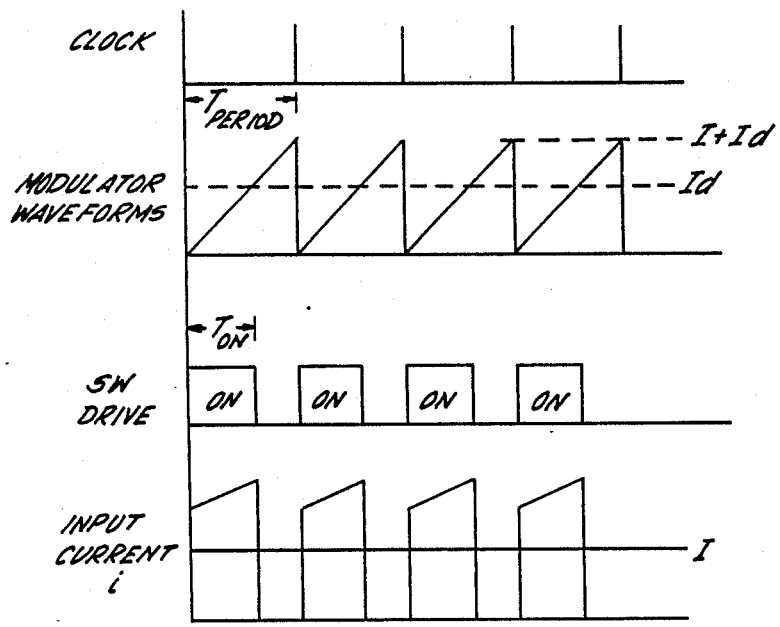
FIG. 7 depicts the pertinent waveforms illustrating the operation of the control arrangement depicted in FIG. 6.

Referring now to FIGS. 6 and 7, a buck-boost convertor is depicted in which a first output terminal of the bridge rectifier 3 is connected to one terminal of the convertor 4 and, via inductor 11 and series connected diode 12, to the other terminal of convertor 4. The second output terminal of bridge rectifier 3 is connected via switching means 14 to a terminal connecting inductor 11 and diode 12. The feedback loop comprises signal $I_d$, derived from the output voltage by voltage sensing means 15 in the manner hitherto described, and signal I derived from the input current, both signals being fed to sawtooth modulator 26. In this embodiment, the sawtooth amplitude is set by the sum of the signals I and $I_d$. The switching means 14 is closed and the sawtooth modulator 26 reset at a time determined by the clock timing pulses from clocking means 21. The switching means is opened when the sawtooth waveform level exceeds the $I_d$ signal level.

$[V_o]$ and $[V_i]$ are related in a buck-boost convertor of the present description by the relation $$[V_o]=[V_i]\times D/(1-D)$$

The sawtooth modulator provides a predetermined time varying signal which results in the duty ratio D satisfying the relation $$D=I_d/(I_d+I)$$

Consequently $$[V_o]=[V_i]\times I_d/I$$

Therefore $$I=I_d\times V_{ipk}\text{abs(sinwt)}/[V_o]$$

The control action is therefore the same as for the embodiment depicted in FIG. 6.

Figure 8:
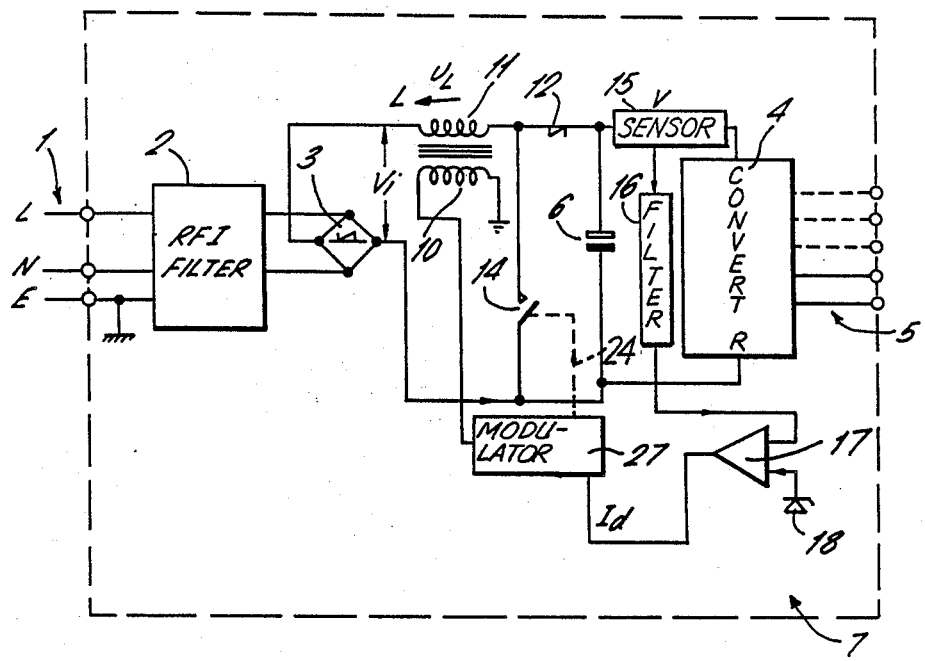
FIG. 8 depicts a further control arrangement in a switched mode power supply in accordance with the present invention.
Figure 9:
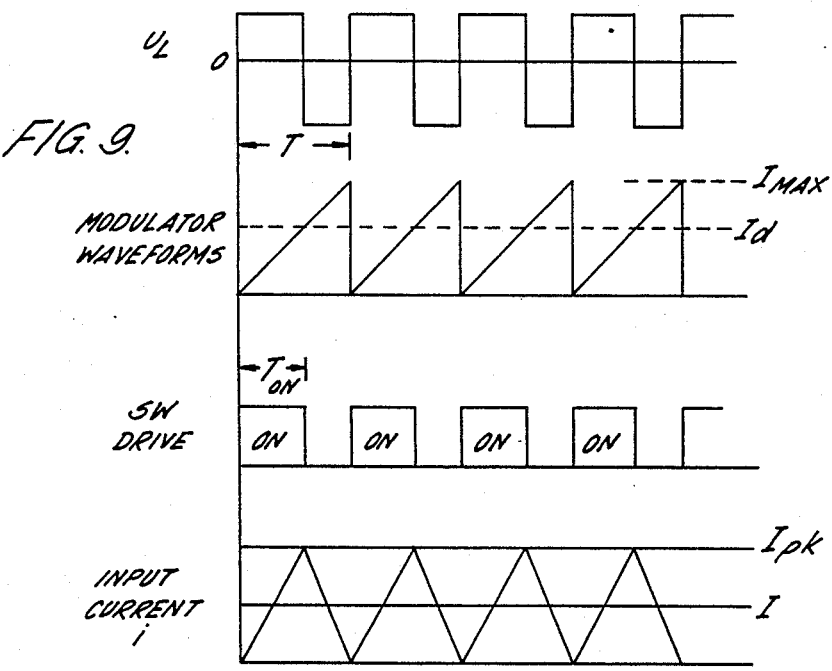
FIG. 9 depicts the pertinent waveforms illustrating the operation of the control arrangement depicted in FIG. 8.

Referring now to FIGS. 8 and 9, a boost convertor arranged for operating at the self-oscillating mode boundary of the continuous/discontinuous modes is depicted. The arrangement differ structurally from that depicted in FIG. 6 in that the switching frequency of the sawtooth modulator 27 is governed not by a clocking means but by a winding on inductor 11 providing a signal indicative of the energy of the inductor, the switching means being operated whenever the energy in the inductor falls to zero.

From the waveforms depicted in FIG. 9 it will be appreciated that:

$$T_{ON} = I_d \times T / I_{MAX}$$

However $I_{pk} = V_i \times T_{ON}/L$
Where L is the inductance of inductor 11 hence $$I_{pk} = V_{ipk} \times T_{ON} \text{abs}(\sin wt)/L$$
$$= V_{ipk} \times I_d T \times \text{abs}(\sin wt)/(L \times I_{MAX})$$

But $I = I_{pk}/2$
Hence
$$I = I_d \times T \times V_{ipk} \text{ abs}(\sin wt)/(2 \times L \times I_{MAX})$$

Consequently, the waveforms of input current is also constrained to that of the input voltage.

Figure 10:
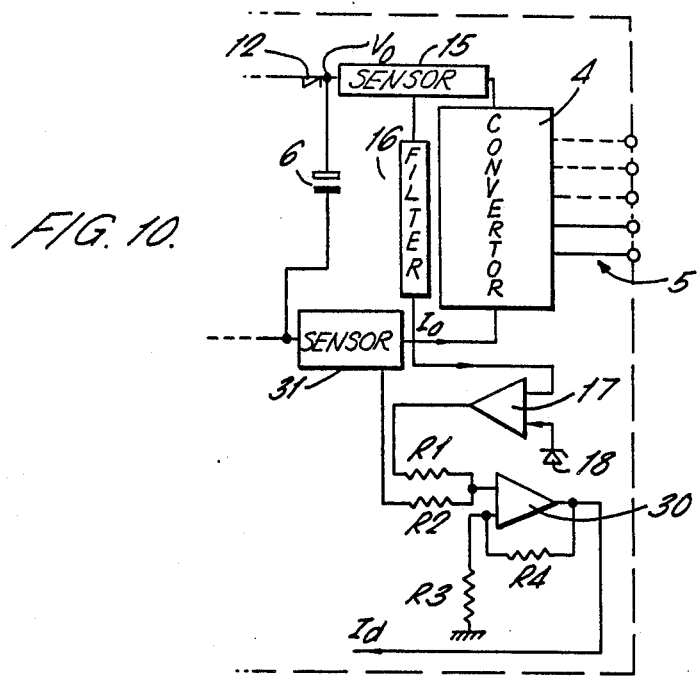
FIG. 10 depicts a voltage control means in accordance with an aspect of the present invention.

Referring now to FIG. 10, an improved output voltage control system is depicted. The feedback loop of the control means for the system comprises an output voltage sensing means 15 feeding signal via notch filter 16 to comparator 17 to provide an voltage error signal which is fed to resistor R1. Output current sensing means 31 feeds an output current signal to resistor R2 and the two signals are summed at the junction of resistors R1 and R2. The gain around the output current loop is arranged to be just less than unity by choosing appropriate valves of R1 and R2, R1 having to be greater than R2.

Consequently, the majority of the control signal $I_d$ is provided by the output current loop, comparator 17 providing the remainder. The summed signals are fed to the non-inverting input of comparator 30 arranged as an amplifier having the inverting input connected via resistor R3 to earth and resistor R4 to its own output. Consequently comparator 30 together with resistors R3 and R4 provide for scaling of the control signal $I_d$. Accordingly, a coarse/fine control is provided, allowing rapid response to changes in output load current and a relatively slower voltage control response.

Such a voltage control system is not restricted to use in waveform corrector systems but may be used whenever improved speed of response to changes in load current is required. For instance, the dc-dc convertor itself may have primary or secondary switching regulated by a control means as hitherto described.

Figure 11:
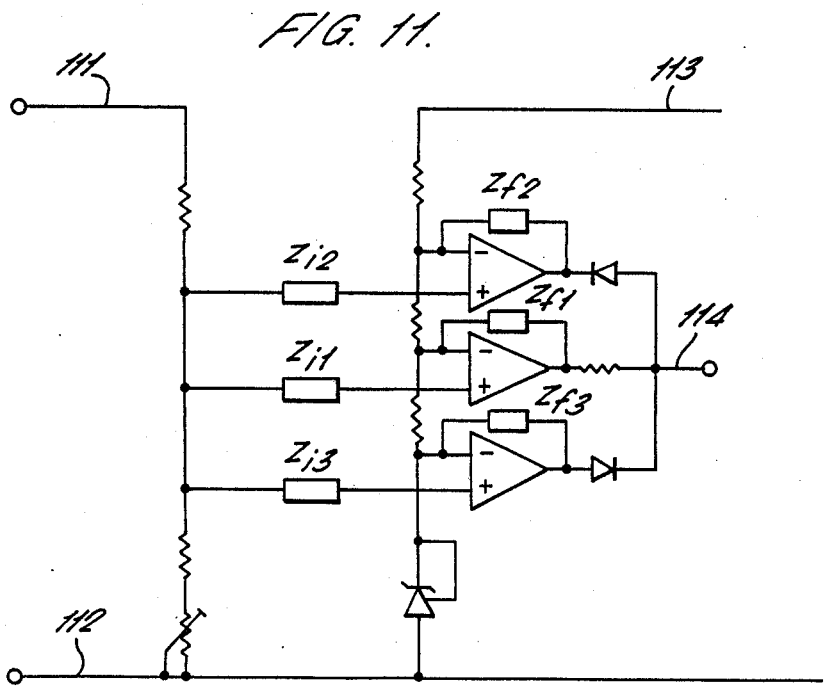
FIG. 11 illustrates a modification of the invention.

The response of the voltage control loop must be such that the twice input frequency component of the line capacitor voltage waveform is a negligibly small component of the demand waveform if distortion of the input current waveform due to this phase shifted component is to be avoided. This is achieved in the circuit shown in FIG. 11 by the use of a variable gain-bandwidth system in which the gain-bandwidth product is restricted within a voltage band centered on the set line capacitor voltage so as to adequately reject line ripple from the demand voltage. The line capacitor voltage appears between the rails 111 and 112; the circuit has a regulated auxiliary rail 113 and provides a demand voltage at 114. The dimension of the voltage band is determined by the maximum ripple voltage. Outside this band the loop gain-bandwidth is tailored to produce the required transient performance to input voltage and load current changes. This arrangement can thereby be made tolerant to a range of input frequencies.

We claim:

1. A control arrangement for interfacing a main converter in a switched mode power supply with a full wave rectified mains power supply, the control arrangement receiving an average input voltage $V_i$ having a rectified sinusoidal waveform from the rectified mains supply and providing an average output d.c. voltage $V_o$ as the input to the main converter, and comprising a voltage converter having an inductance, a switching means to connect the inductance across said input voltage, and a control means determining the average input current I to the voltage converter and operable to control a switching duty ratio D of the switching means in dependence thereon, wherein the voltage converter has a voltage transfer function which is a function f(D) of the duty ratio, and said control means is arranged so that f(D) is substantially inversely proportional to I so that the average input current has substantially the same waveform as said average input voltage.

2. Control arrangement as claimed in claim 1, wherein the predetermined relation is $f(D) = I_d/I$ wherein $I_d$ represents error in said output voltage.

3. Control arrangement as claimed in claim 2, wherein the control means is configured as a feedback loop comprising means to sense said output voltage from the arrangement and remove any unwanted ripple, means comparing the output voltage with a reference level to provide a signal representing $I_d$, means providing a signal representing I, and a modulator having a clocking means for resetting the modulator at a fequency substantially greater than said waveform, and wherein the modulator controls the duty ratio of the switching means.

4. Control arrangement as claimed in claim 3, wherein said voltage converter is arranged to operate in the continuous mode.

5. Control arrangement as claimed in claim 3, wherein the modulator is a sawtooth modulator.

6. Control arrangement as claimed in claim 2, wherein $f(D) = 1/(1-D)$ so that the duty ratio D is controlled to be equal to $1 - I/I_d$.

7. Control arrangement as claimed in claim 6, wherein the modulator is a sawtooth modulator having a sawtooth signal generated therein, and wherein the signal representing $I_d$ controls that amplitude peak reached by the sawtooth signal and the switching means is operable to be closed when signal levels of the sawtooth signal exceed the signal representing I.

8. Control arrangement as claimed in claim 2, wherein $f(D) = D/(1-D)$ so that the duty ratio D is controlled to be equal to $I_d/(I_d+1)$.

9. Control arrangement as claimed in claim 8, wherein the modulator is a sawtooth modulator having a sawtooth signal generated therein, and wherein the sum of the signals representing I and $I_d$ controls that amplitude peak reached by the sawtooth signal and the switching means is operable to be opened when signal values of the sawtooth signal exceed the signal representing $I_d$.

10. A control arrangement for interfacing a main converter in a switched mode power supply with a full wave rectified mains power supply, the control arrangement receiving an average input voltage $V_i$ having a rectified sinusoidal waveform from the rectified mains supply and providing an average output d.c. voltage $V_o$ as the input to the main converter, and comprising a voltage converter having an inductance, a switching means to connect the inductance across said input voltage, and a control means operable to control the switching means, wherein said control means includes a secondary winding on said inductance to provide a signal indicative of energy in the inductor, and is arranged to close the switch means when said energy falls to zero and to open the switch means after a predetermined interval dependent on error in said output voltage.

* * * * *

UNITED STATES PATENT AND TRADEMARK OFFICE
CERTIFICATE OF CORRECTION

PATENT NO. : 4,942,509
DATED : July 17, 1990
INVENTOR(S) : Jonathan Shires et al.

It is certified that error appears in the above-identified patent and that said Letters Patent is hereby corrected as shown below:

On the title page:

Delete [75] Inventors: Jonathanes Shires; John Turner, both of Wetherby, England Insert [75] Inventors: Jonathan Shires; John Turner, both of Wetherby, England Co. 8, line 16, delete "I so", insert --I, so--

Signed and Sealed this

Third Day of September, 1991

*Attest:*

HARRY F. MANBECK, JR.

*Attesting Officer*     *Commissioner of Patents and Trademarks*